United States Patent [19]

Schnurr et al.

[11] Patent Number: 5,205,126

[45] Date of Patent: Apr. 27, 1993

[54] VEHICULAR COOLING APPARATUS

[76] Inventors: Brian F. Schnurr, 3618 Flaherty Cir.; Michael S. Preston, 991-E Tulip Pl., both of Honolulu, Hi. 96818

[21] Appl. No.: 868,672

[22] Filed: Apr. 15, 1992

[51] Int. Cl.⁵ .............................................. F25B 9/04
[52] U.S. Cl. ............................................ 62/5; 62/172
[58] Field of Search ............................. 62/5, 172, 401

[56] References Cited

U.S. PATENT DOCUMENTS

| | | | |
|---|---|---|---|
| 2,920,457 | 1/1960 | Bartlett, Jr. | 62/5 |
| 3,026,681 | 3/1962 | Green | 62/5 |
| 3,630,039 | 12/1971 | Hayashi | 62/5 |
| 4,407,134 | 10/1983 | Snaper | 62/5 |
| 4,430,867 | 2/1984 | Warner | 62/172 X |

*Primary Examiner*—William E. Tapolcai
*Attorney, Agent, or Firm*—Leon Gilden

[57] ABSTRACT

A vehicular cooling apparatus is arranged to include a compressor directing cooling and compressed air through a directional tube from a storage flask into an associated cooling chamber. Inlet air is directed through the cooling chamber into the vehicular passenger compartment. Typically, the use of freon is eliminated by use of the directional tube.

1 Claim, 4 Drawing Sheets

VEHICULAR COOLING APPARATUS

BACKGROUND OF THE INVENTION

1. Field of the Invention

The field of invention relates to vehicle cooling apparatus, and more particularly pertains to a new and improved vehicular cooling apparatus wherein the same is arranged for directing cooling air through a tube from a storage flask eliminating the use of freon.

2. Description of the Prior Art

Environmental contemporary concerns have mandated the elimination of freon as a compressible gas for use in refrigerant cycles, particularly in vehicles. The instant invention attempts to overcome deficiencies of the prior art by utilizing a system eliminating the use of such freon gas. Prior art cooling apparatus for use by vehicles is set forth in the U.S. Pat. Nos. 4,538,424; 3,817,043; 4,280,330; and 4,064,705.

U.S. Pat. No. 4,526,013 sets forth an environmental protection system utilizing an electrically driven Rankine cycle cooling loop.

As such, it may be appreciated that there continues to be a need for a new and improved vehicular cooling apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of cooling apparatus now present in the prior art, the present invention provides a vehicular cooling apparatus wherein the same as addressed to the utilization of a directional tube typically known as a "Vortex tube"(R). As such, the general purpose of the present invention, which will be described subsequently in greater detail, is to provide a new and improved vehicular cooling apparatus which has all the advantages of the prior art cooling apparatus and none of the disadvantages.

To attain this, the present invention provides a vehicular cooling apparatus arranged to include a compressor directing cooling and compressed air through a directional tube from a storage flask into an associated cooling chamber. Inlet air is directed through the cooling chamber into the vehicular passenger compartment. Typically, the use of freon is eliminated by use of the directional tube.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved vehicular cooling apparatus which has all the advantages of the prior art cooling apparatus and none of the disadvantages.

It is another object of the present invention to provide a new and improved vehicular cooling apparatus which may be easily and efficiently manufactured and marketed.

It is a further object of the present invention to provide a new and improved vehicular cooling apparatus which is of a durable and reliable construction.

An even further object of the present invention is to provide a new and improved vehicular cooling apparatus which is susceptible of a low cost of manufacture with regard to both materials and labor, and which accordingly is then susceptible of low prices of sale to the consuming public, thereby making such vehicular cooling apparatus economically available to the buying public.

Still yet another object of the present invention is to provide a new and improved vehicular cooling apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
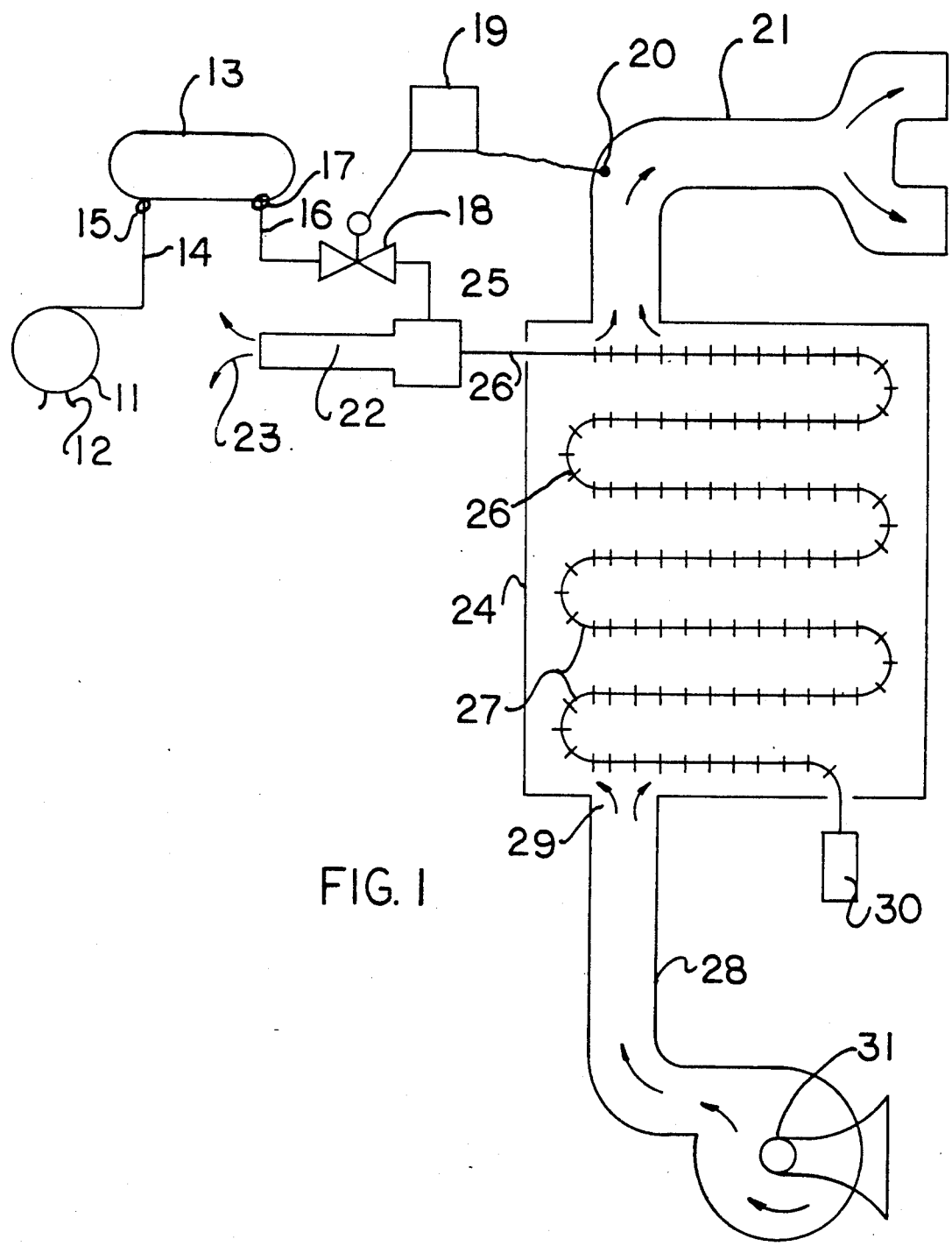
FIG. 1 is a diagrammatic illustration of the instant invention.
Figure 2:
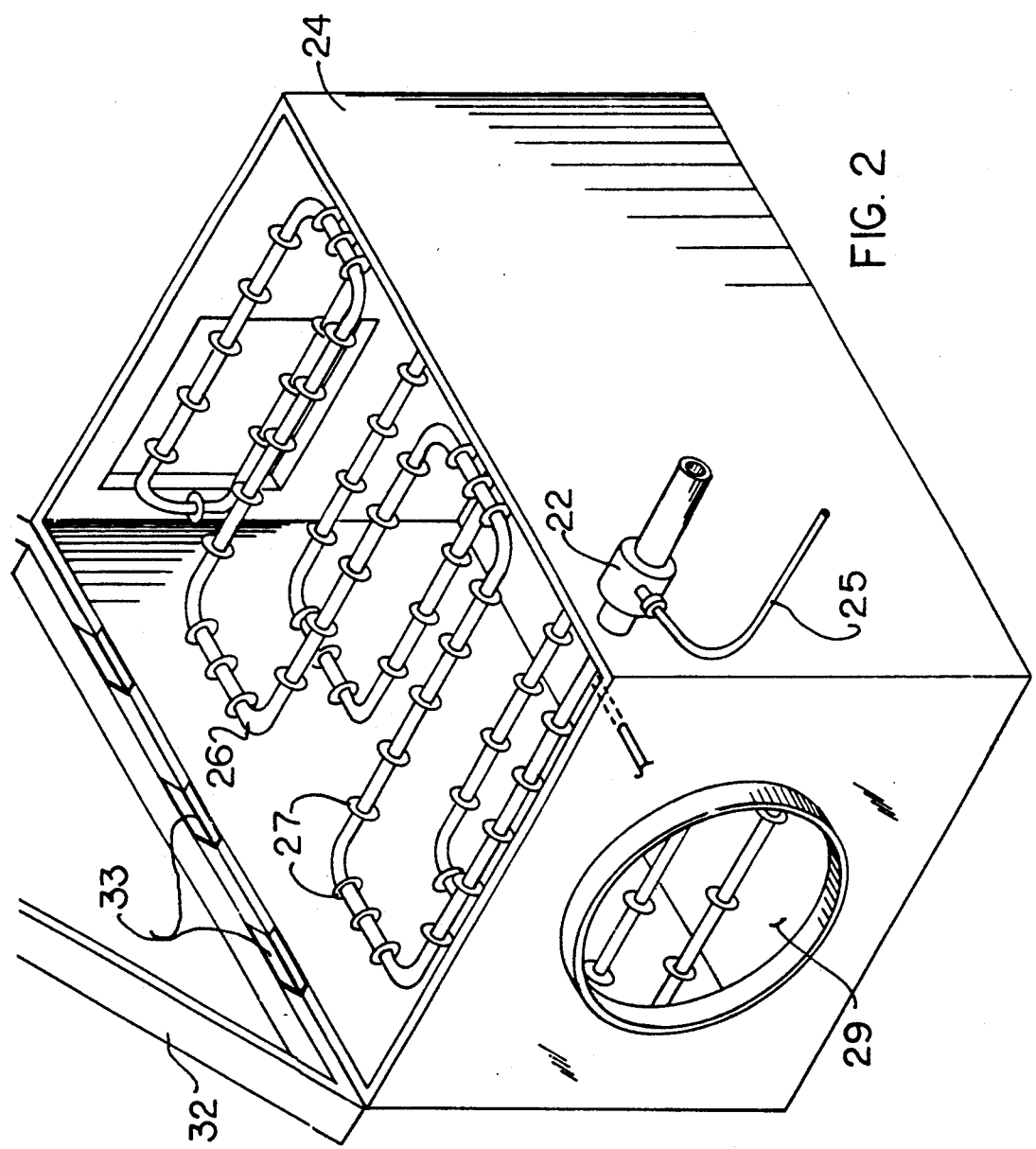
FIG. 2 is an isometric illustration of the cooling chamber utilized by the invention.
Figure 3:
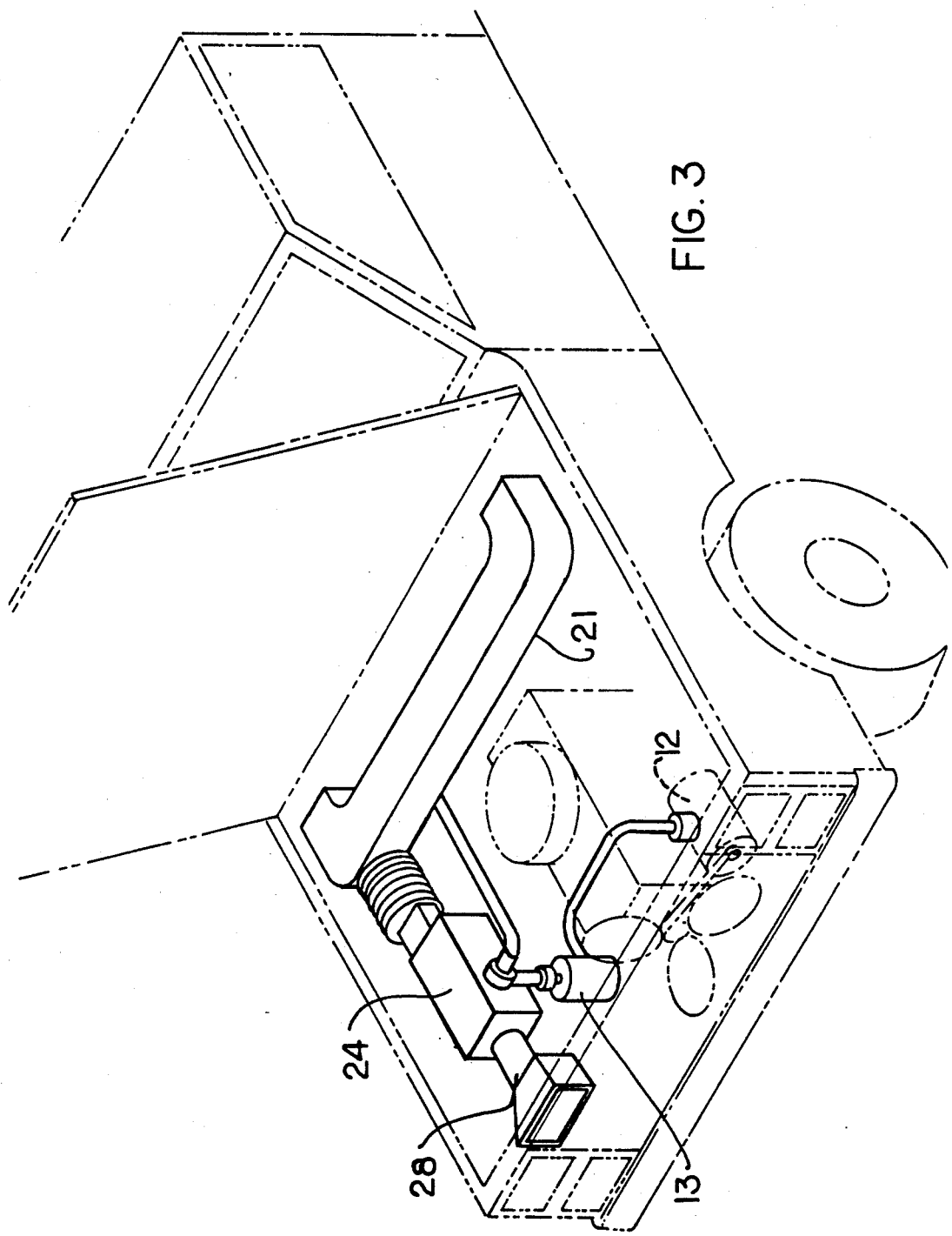
FIG. 3 is an isometric illustration of the invention utilized in a vehicular environment.
Figure 4:
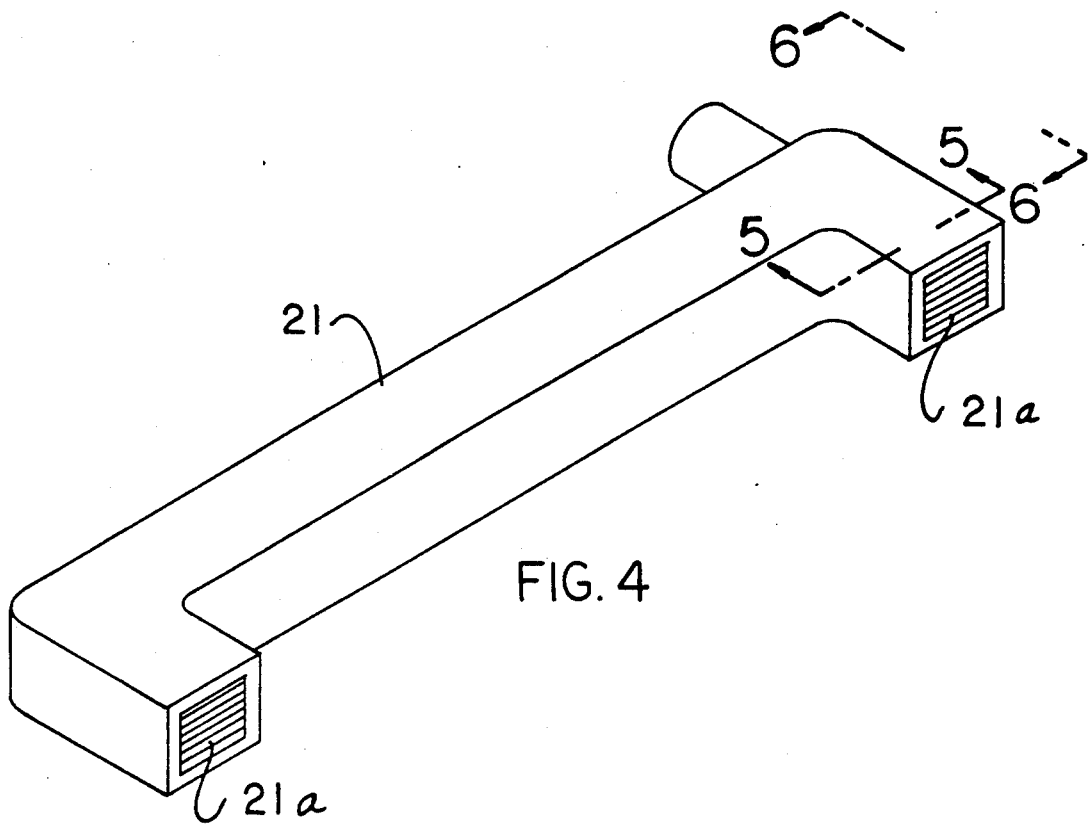
FIG. 4 is an isometric illustration of the exit plenum utilized by the invention.
Figure 5:
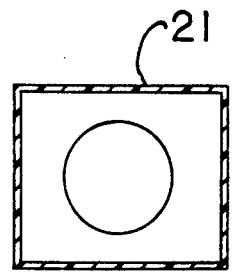
FIG. 5 is an orthographic view, taken along the lines 5—5 of FIG. 4 in the direction indicated by the arrows.
Figure 6:
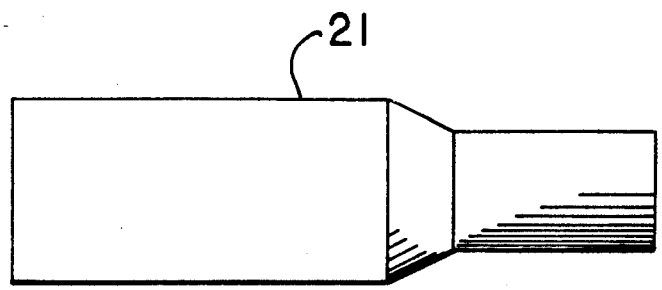
FIG. 6 is is an orthographic view, taken along the lines 6—6 of FIG. 4 in the direction indicated by the arrows.

With reference now to the drawings, and in particular to FIG. 1 to 6 thereof, a new and improved vehicular cooling apparatus embodying the principles and concepts to the present invention and generally designated by the reference numeral 10 will be described.

More specifically, the invention utilized a directional bore "Vortex tube" as commercially available through Vortex Corporation located at 10125 Carver Road, Cincinnati, Ohio 45242-9976. The "Vortex tube" (R) is exemplified by the numeral 22 and is operative utilizing centrifugal force creating a low pressure area and thereby directing low temperature from the Vortex tube which may reach temperature to minus 50 degrees F. Hot air, as indicated by the exhaust air 23, is exhausted from the Vertex tube during its working with the compressed cooling air directed therethrough, in a manner to be described in more detail below. For example, the compressor 11 is formed with a compressor intake 12 directing compressed air into a storage flask 13 through a first conduit 14 having a check valve 15 permitting one-way flow of air into the storage flask 13. A second conduit 16 directs air on demand from the storage flask 13 through a second check valve 17 permitting one-way flow the storage flask 13. A solenoid valve 18 is operative through a thermostatic control 19 having a thermostatic control sensor 20 positioned within an exit plenum 21 directing cooling air into an interior compartment of a typical vehicle. Thusly cooled air from the "Vortex tube" (R) 22 is directed into the cooling chamber 24 by use of a cooling fourth conduit 26 directing air from a third conduit 25 through the Vortex tube. The cooling fourth conduit 26 includes cooling fins 27 enhancing cooling of air into the cooling chamber 24 from an inlet plenum 28. The inlet plenum 28 includes a blower motor 31 directing air through the inlet plenum 28 into the cooling chamber through a cooling chamber entrance 29. The cooling chamber, as illustrated, is formed with a lid 32 about hinges 33 to provide for access to the cooling chamber for its maintenance and repair.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular cooling apparatus, comprising,
a compressor, the compressor including a compressor intake, and a first conduit directed from the compressor at first conduit first distal end,
and
a storage flask, the storage flask in fluid communication with the first conduit at a first conduit second distal end,
and
a first conduit check valve within the first conduit between the compressor and the storage flask,
and
a second conduit, the second conduit including a second conduit first distal end directed into pneumatic communication with the storage flask,
and
a solenoid valve, with a second conduit second distal end directed into the solenoid valve,
and
a second conduit check valve oriented between the solenoid valve and the storage flask,
and
a third conduit directed from the solenoid valve,
and
a directional tube directing cooled air from the third conduit exteriorly of the directional tube,
and
a fourth conduit directed from the directional tube in pneumatic communication with the directional tube and the third conduit,
and
a cooling chamber, the fourth conduit directed into the cooling chamber,
and
a plurality of spaced cooling fins mounted in surrounding relationship relative to the fourth conduit within the cooling chamber,
and
an exit plenum directed in pneumatic communication with the cooling chamber exteriorly thereof, with the exit plenum including a temperature sensor positioned therewithin,
and
a thermostatic control, and the thermostatic control in communication with the temperature sensor and the solenoid valve for effecting actuation of the solenoid valve in relation to a predetermined temperature detected by the temperature sensor,
and
an inlet plenum directed into the cooling chamber,
and
the inlet plenum directed into a first wall of the cooling chamber, and the exit plenum directed into the second spaced parallel wall of the cooling chamber,
and
the cooling chamber including a hinged lid hingedly mounted to the cooling chamber for access interiorly of the cooling chamber,
and
the fourth conduit projecting from the cooling chamber, and including a muffler positioned exteriorly of the cooling chamber,
and
the inlet plenum including a blower motor mounted within the inlet plenum for directing air through the inlet plenum and the cooling chamber for projection into the exit plenum.

* * * * *